(12) United States Patent
Aoun et al.

(10) Patent No.: US 9,579,952 B2
(45) Date of Patent: Feb. 28, 2017

(54) DEVICE FOR THE THERMAL CONDITIONING OF A PASSENGER COMPARTMENT OF A VEHICLE

(75) Inventors: Bernard Aoun, Paris (FR); Mohamed Yahia, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 570 days.

(21) Appl. No.: 13/988,556

(22) PCT Filed: Nov. 15, 2011

(86) PCT No.: PCT/EP2011/070106
§ 371 (c)(1),
(2), (4) Date: Jul. 22, 2013

(87) PCT Pub. No.: WO2012/069334
PCT Pub. Date: May 31, 2012

(65) Prior Publication Data
US 2014/0102126 A1    Apr. 17, 2014

(30) Foreign Application Priority Data

Nov. 22, 2010  (FR) ..................... 10 04533

(51) Int. Cl.
| F25D 17/06 | (2006.01) |
| B60H 1/22 | (2006.01) |
| B60H 1/00 | (2006.01) |
| F25B 5/02 | (2006.01) |
| F25B 6/04 | (2006.01) |

(Continued)

(52) U.S. Cl.
CPC ............. *B60H 1/22* (2013.01); *B60H 1/0045* (2013.01); *B60H 1/00328* (2013.01); *B60H 1/00899* (2013.01); *B60H 1/3227* (2013.01); *F25B 5/02* (2013.01); *F25B 6/04* (2013.01); *F25B 25/005* (2013.01); *B60H 2001/00928* (2013.01)

(58) Field of Classification Search
CPC ...... B60H 1/00371; B60H 2001/00235; F25D 23/003; F25D 19/02
USPC .................. 62/244, 498, 428, 440, 441, 448
See application file for complete search history.

(56) References Cited

U.S. PATENT DOCUMENTS

2003/0200764 A1   10/2003  Takeuchi et al.
2005/0067158 A1   3/2005   Ito et al.

FOREIGN PATENT DOCUMENTS

| DE | 10346960 A1 | 5/2005 |
| EP | 1489367 A1 | 12/2004 |

OTHER PUBLICATIONS

English language abstract and translation for DE 10346960 extracted from espacenet.com on Oct. 22, 2013, 7 pages.

(Continued)

*Primary Examiner* — Melvin Jones
(74) *Attorney, Agent, or Firm* — Howard & Howard Attorneys PLLC

(57) ABSTRACT

A device for thermal conditioning includes a cooling fluid circuit, a heat transfer fluid circuit, and a fluid/fluid heat exchanger that is intended to enable thermal exchange between the cooling fluid and the heat transfer fluid. The cooling fluid circuit includes at least one compressor, a first outer heat exchanger through which an outer air flow passes and a first evaporator. The heat transfer fluid circuit includes at least a first inner heat exchanger, a first heat source and a second outer heat exchanger through which the outer air flow passes. The cooling fluid circuit includes a second evaporator.

14 Claims, 2 Drawing Sheets

Figure 1:
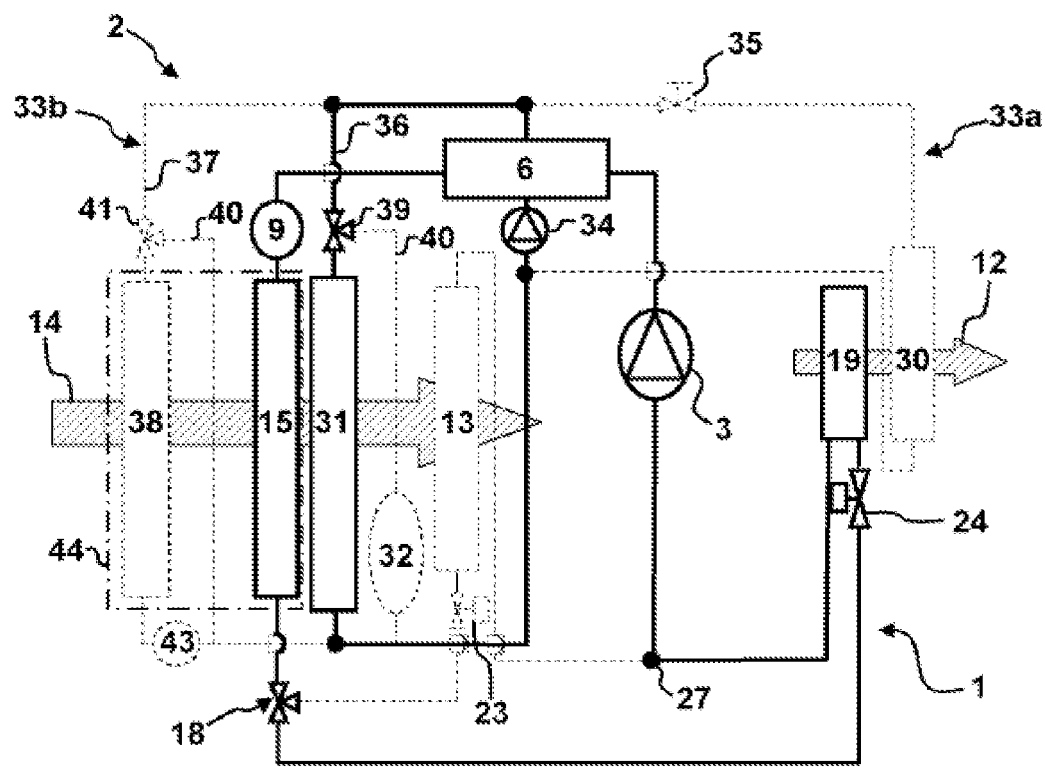

(51) Int. Cl.
*F25B 25/00* (2006.01)
*B60H 1/32* (2006.01)

(56) References Cited

OTHER PUBLICATIONS

International Search Report for Application No. PCT/EP2011/070106 dated Dec. 29, 2011, 5 pages.

DEVICE FOR THE THERMAL CONDITIONING OF A PASSENGER COMPARTMENT OF A VEHICLE

RELATED APPLICATIONS

This application is the National Stage of International Patent Application No. PCT/EP2011/070106, filed on Nov. 15, 2011, which claims priority to and all the advantages of French Patent Application No. FR 10/04533, filed on Nov. 22, 2010, the content of which is incorporated herein by reference.

The domain of the present invention is that of vehicles whose propulsion is provided by at least one electric motor. This domain encompasses electric vehicles propelled solely by an electric motor, and hybrid vehicles, propelled by an electric motor and an internal combustion engine. More particularly, the invention is aimed at a device for the thermal conditioning of a passenger compartment of such a vehicle.

The increasing scarcity of energy resources for internal combustion engines and the environmental impact of such internal combustion engines have led the automobile manufacturers to develop vehicles functioning by means of alternative energy sources. Vehicle propulsion using electrical energy is a solution that represents an interesting choice. However, the absence of an internal combustion engine in electric vehicles, or the temporary unavailability of this engine in hybrid vehicles, deprive the vehicle of an energy source for providing suitable thermal conditioning of the passenger compartment, in particular, heating of the latter.

In order to remedy this deficiency, it has been proposed to use an air conditioning loop, suited to providing a circulation of a cooling fluid, organized and configured so as to provide heating and/or cooling of an inner air flow intended to be sent into the passenger compartment of the vehicle. The air conditioning loop thus functions according to a mode called "cooling" in which a first heat exchanger cools the flow of inner air distributed in the passenger compartment, while a second heat exchanger provides cooling of the cooling fluid by evacuating calories into an air flow outside the passenger compartment. The air conditioning loop also operates in a mode called "heating", or a mode called "heat pump", in which the first heat exchanger heats the flow of inner air distributed in the passenger compartment. The second heat exchanger provides the evaporation function, the flow of outer air being cooled by its passage through the second heat exchanger.

In so-called "heating" mode or so-called "heat pump" mode, depending on particular climatic conditions, the second heat exchanger is likely to become covered with hoarfrost. This phenomenon is the result of the cooling provided by the second heat exchanger, which lowers the temperature of the outer air flow passing through it to around 0° C., thus causing the moisture present in the outer air flow to freeze. This situation is problematical, as the hoarfrost obstructs the passage of the outer air flow through the second heat exchanger, which significantly degrades the performance of the air conditioning loop in so-called "heating" mode. Such degradation can generate a deficiency in the "heating" function of the inner air flow distributed in the passenger compartment.

The aim of the present invention proposes to resolve the disadvantage described above, principally by providing a supplementary evaporator installed at the front end of the vehicle through which the outer air flow, heated beforehand, passes, at the same time providing heating of the inner air flow distributed in the passenger compartment by means of a heat transfer fluid loop.

The object of the invention is therefore a thermal conditioning device including a cooling fluid circuit, a heat transfer fluid circuit and a fluid/fluid heat exchanger that is intended to enable a thermal exchange between the cooling fluid and the heat transfer fluid. The cooling fluid circuit includes at least one compressor, a first outer heat exchanger, through which an outer air flow passes, and a first evaporator. The heat transfer fluid circuit includes at least one inner heat exchanger, a first heat source and a second outer heat exchanger through which the outer air flow passes. More particularly, the cooling fluid circuit includes a second evaporator.

Advantageously, the first evaporator is constructed for the passage of the outer air flow in such a way that the outer air flow successively passes through the second outer heat exchanger, then through the first evaporator.

In accordance with this construction, the outer air flow thus captures the calories present in the first outer heat exchanger and transports them towards the first evaporator so as to defrost it. The first heat source can be, for example, an internal combustion engine, an electric motor or an electric heating element.

According to a particular configuration, the second evaporator is installed in the cooling fluid circuit, in parallel with the first evaporator.

According to a first characteristic of the invention, the cooling fluid circuit includes a management unit for circulating the cooling fluid towards the first evaporator and/or the second evaporator. The circulation management unit is, for example, a three-way valve capable of controlling the circulation of the cooling fluid, either towards the first evaporator, or towards the second evaporator, or towards the first evaporator and the second evaporator simultaneously.

As a particular example of an embodiment, the cooling fluid circuit includes a single management unit for circulating the cooling fluid towards the first evaporator and/or the second evaporator. In this configuration, one notes that the cooling fluid circuit includes a sole and single circulation management unit for providing the different operating modes of the cooling fluid circuit, that is to say, notably, a mode called "heating", a mode called "cooling", a mode called "drying" and a mode called "defrosting". The reliability and simplicity of such a thermal conditioning device are improved.

According to another characteristic of the invention, the cooling fluid circulation management unit authorizes the simultaneous circulation of the cooling fluid towards the first evaporator and towards the second evaporator. Such a configuration thus enables an enhanced performance of the cooling fluid circuit by increasing the heat load, notably by combining the utilization of the first evaporator, in particular in so-called "drying" mode, with the utilization of the second evaporator.

According to another characteristic of the invention, the first outer heat exchanger is constructed for the passage of the outer air flow prior to the passage of the outer air flow through the first evaporator. In such a configuration, the outer air flow is heated on passing through the first outer heat exchanger. Thus, a flow of warm air sweeps through the first evaporator, thereby providing a defrosting function and/or a function limiting the icing of the first evaporator.

According to yet another characteristic of the invention, the first outer heat exchanger is constructed for the passage of the outer air flow prior to the passage of the outer air flow through the second outer heat exchanger.

Advantageously, the heat transfer fluid circuit includes at least a first loop including the fluid/fluid heat exchanger and the inner heat exchanger.

Preferentially, the heat transfer fluid circuit includes a second loop including the fluid/fluid heat exchanger, the first heat source installed, for example, in parallel with the second outer heat exchanger, and a second heat source installed, for example, in series with a third outer heat exchanger.

The fluid/fluid heat exchanger is thus installed on a portion of heat transfer fluid circuit common to the first loop and to the second loop.

Advantageously, the second loop includes the third outer heat exchanger installed in series with the second heat source and constructed for the passage of the outer air flow prior to its passage through the first evaporator.

Further advantageously, the third outer heat exchanger is constructed for the passage of the outer air flow prior to its passage through the second outer heat exchanger.

According to a variant embodiment of the invention, the third outer heat exchanger and the first outer heat exchanger are constructed for the passage of distinct portions of outer air flow.

Advantageously, an inner air flow intended to be distributed in the passenger compartment of a vehicle passes through the inner heat exchanger and the second evaporator.

One understands that the thermal conditioning device invoked above is suited to functioning in a mode called "cooling" enabling the inner air flow to be cooled, in a mode called "heating" enabling the inner air flow to be heated, in a mode called "drying" enabling the inner air flow to be dried and in a mode called "defrosting" enabling the first evaporator to be defrosted.

Finally, the present invention is also aimed at a method for defrosting a first evaporator integral with a thermal conditioning device such as that described above, during which one activates the first source in order to heat the second outer heat exchanger by means of the outer air flow.

A very first advantage according to the invention resides in the possibility of maintaining the "heating" function of the passenger compartment whatever the climatic conditions outside the vehicle. In particular, the "heating" function is maintained when the temperature of the outside air is less than 5° C., when the risk of frosting becomes significant.

Another advantage appears when the thermal conditioning device according to the invention is used in so-called "drying" mode of the inner air flow distributed in the passenger compartment. In fact, the presence of the first evaporator and of the second evaporator enables a "drying" function to be provided for two distinct air flows. Such an arrangement offers the possibility of maintaining a high heat load on the cooling fluid circuit, and thereby of guaranteeing a raising of the temperature of the cooling fluid compatible with the heating requirement in the passenger compartment, in particular when the "heating" function is provided by an intermediary, notably the heat transfer fluid circulating in the heat transfer fluid circuit. One thereby guarantees that the output from the cooling fluid circuit remains high in so-called "drying" mode.

Figure 2:
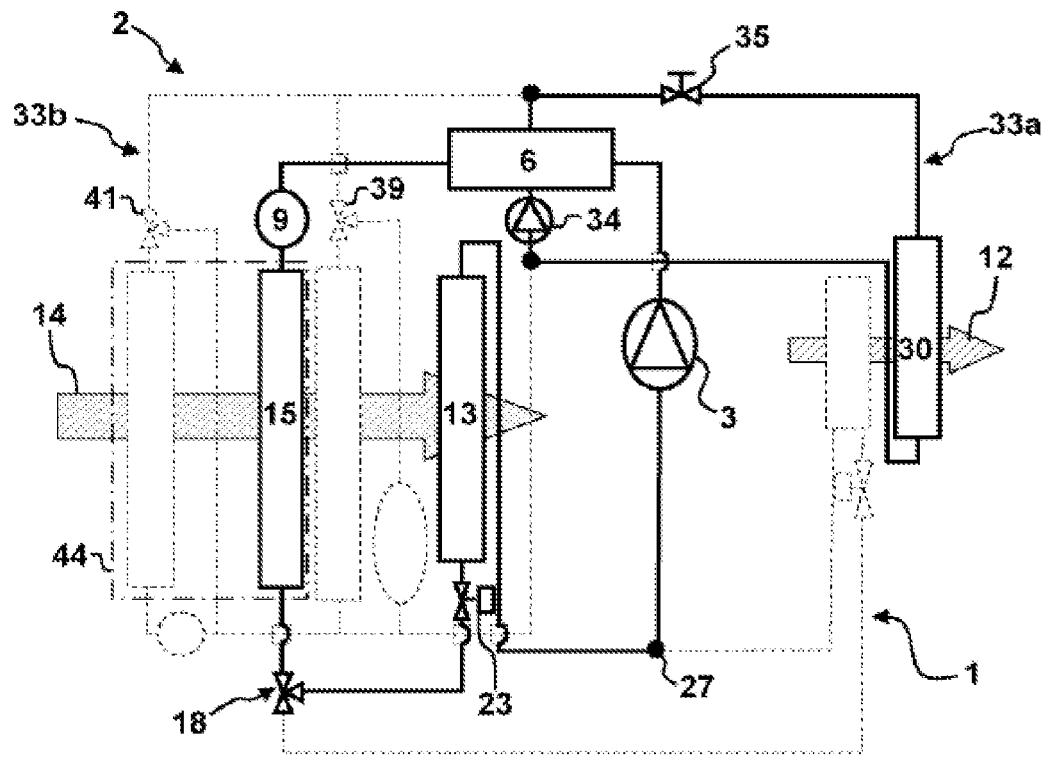
Figure 3:
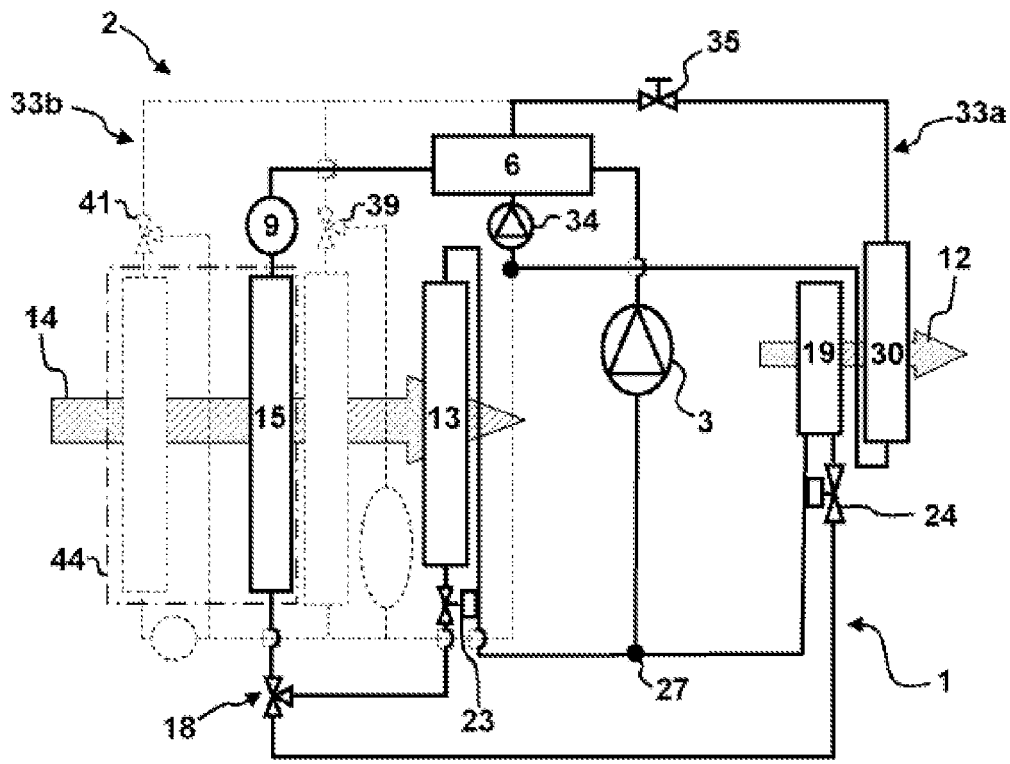
Figure 4:
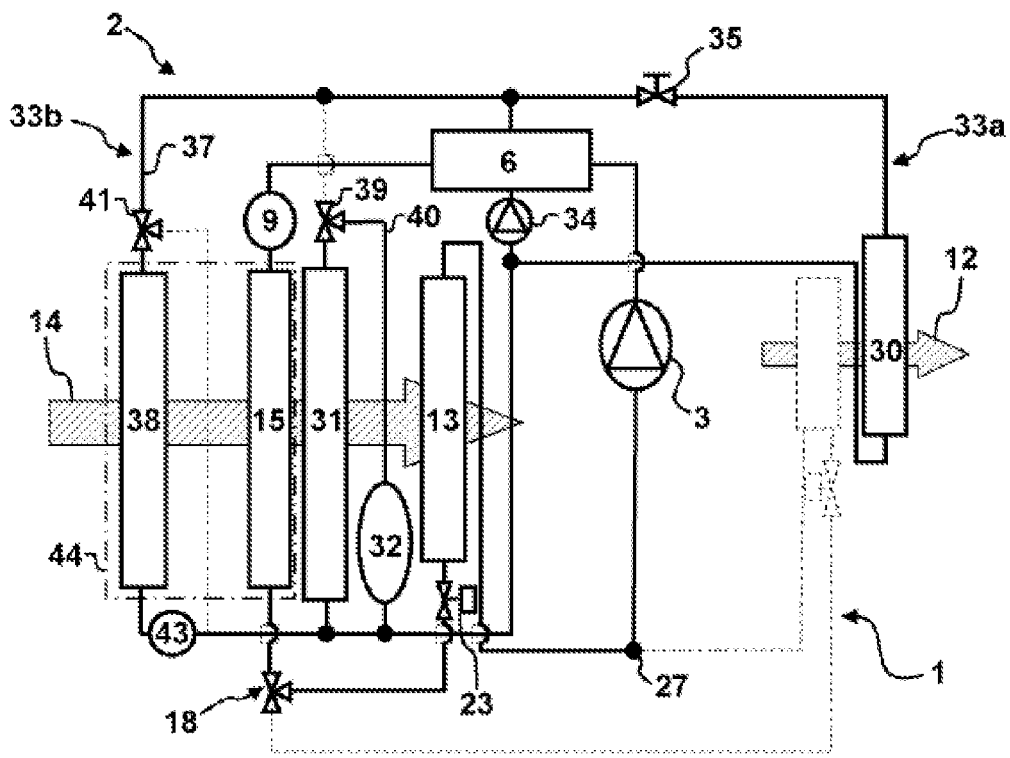

The present invention will be better understood, other characteristics and advantages will yet appear on reading the following detailed description that includes embodiments given for illustration purposes with reference to the attached figures. These are presented as examples, not limiting, and may serve to supplement comprehension of the present invention and the description of its embodiment, and, where applicable, contribute to its definition. In particular:

FIG. 1 is a diagrammatic view of a thermal conditioning device according to the invention in so-called "cooling" mode, FIG. 2 is a diagrammatic view of the thermal conditioning device according to the invention in so-called "heating" mode, FIG. 3 is a diagrammatic view of the thermal conditioning device according to the invention in so-called "drying" mode, and FIG. 4 is a diagrammatic view of the thermal conditioning device according to the invention in so-called "defrosting" mode.

FIG. 1 illustrates a thermal conditioning device according to the invention, including a cooling fluid circuit 1, in which a cooling fluid circulates, and a heat transfer fluid circuit 2, in which a heat transfer fluid circulates.

The cooling fluid circuit 1 is a closed loop, inside which the cooling fluid circulates. The cooling fluid is a subcritical cooling fluid, for example a fluorine compound, notably the compound known by the denomination R134a, or a fluid of the supercritical type, for example carbon dioxide or R744, or any other similar fluid.

The cooling fluid is made to circulate by a compressor 3, whose function is to increase pressure, and by correlation, the temperature of the cooling fluid. According to the present invention, the direction of circulation of the cooling fluid is identical whatever the functioning mode of the thermal conditioning device according to the invention, that is to say, a mode called "cooling", a mode called "heating", a mode called "drying" or a mode called "defrosting".

The compressor 3 can be a mechanical compressor driven by the internal combustion engine of a hybrid vehicle. The invention also finds an application in the context where the compressor 3 can be an electric compressor. Advantageously, the compressor 3 is an electric compressor, in particular of the high-voltage type, that is to say, suited to functioning at voltages between 350 Volts and 500 Volts.

Moreover, the compressor 3 is, for example, of the type with pistons, with vanes, with scroll. Moreover, the control of the compressor 3 can be internal or external, that is to say, borne on the compressor 3 or integrated on a controller distinct from the compressor 3.

The compressor 3 includes an inlet orifice, through which the cooling fluid arrives, and an outlet orifice, through which the compressed cooling fluid is evacuated. The outlet orifice is connected to a fluid/fluid heat exchanger 6.

The fluid/fluid heat exchanger 6 provides a thermal exchange between the cooling fluid circulating in the cooling fluid circuit 1 and the heat transfer fluid circulating in the heat transfer fluid circuit 2. The fluid/fluid heat exchanger 6 is therefore a heat exchanger whose function is to enable the exchange of calories between the cooling fluid and the heat transfer fluid. According to the present invention, the fluid/fluid heat exchanger 6 acts as a condenser 6 or gas cooler 6. The fluid/fluid heat exchanger 6 therefore provides a cooling function of the cooling fluid. The fluid/fluid heat exchanger 6 retains this cooling function of the cooling fluid whatever the functioning mode of the thermal conditioning device according to the invention.

The fluid/fluid heat exchanger 6 includes a cooling fluid inlet connected to the compressor 3 and a cooling fluid outlet connected to a first outer heat exchanger 15. On passing through the fluid/fluid heat exchanger 6, the cooling fluid thermally exchanges with the heat transfer fluid. To this effect, the fluid/fluid heat exchanger 6 therefore includes a heat transfer fluid inlet orifice and a heat transfer fluid outlet orifice, through which the heat transfer fluid respectively enters and exits the fluid/fluid heat exchanger 6.

Advantageously, a storage device 9 for the cooling fluid is installed between the cooling fluid outlet of the fluid/fluid heat exchanger 6 and the first outer heat exchanger 15. According to a variant of the invention, the storage device 9 for the cooling fluid is a dehyradating bottle. Alternatively, it can also be an accumulator installed directly upstream of the inlet orifice of the compressor 3, in line with the direction of circulation of the cooling fluid in the cooling fluid circuit 1.

The first outer heat exchanger 15 is described as "outer" in the sense that it is constructed to exchange calories with an outer air flow 14. The outer air flow 14 is not intended to be distributed in a passenger compartment of a vehicle. The first outer heat exchanger 15 is therefore an air/cooling fluid heat exchanger. According to the present invention, the first outer heat exchanger 15 acts as a condenser 15 or a gas cooler 15. The first outer heat exchanger 15 therefore provides a cooling function of the cooling fluid in all the functioning modes of the thermal conditioning device according to the invention.

Preferentially, the first outer heat exchanger 15 is installed at the front end of the vehicle. Constructed in this way, the outer heat exchanger 15 is suited to receiving a dynamic air flow resulting from the movement of the vehicle.

The cooling fluid passes through the first outer heat exchanger 15 and exits from it through an outlet orifice before reaching a circulation management unit 18 of the cooling fluid.

The circulation management unit 18 is suited to controlling the circulation of the cooling fluid towards a first evaporator 13 and/or towards a second evaporator 19.

Depending on the functioning mode of the thermal conditioning device according to the invention, the circulation management unit 18 authorizes the circulation of the cooling fluid arriving from the first outer heat exchanger 15, either solely towards the first evaporator 13, or solely towards the second evaporator 19, or simultaneously towards the first evaporator 13 and the second evaporator 19, and advantageously in variable proportions of cooling fluid.

To this effect, the circulation management unit 18 is, for example, a "three-way" valve 18, notably with a proportional controller.

The circulation management unit 18 includes an inlet way connected to the outlet orifice of the first outer heat exchanger 15, a first outlet way connected to a first expansion device 23 and a second outlet way connected to a second expansion device 24. The first expansion device 23 and the second expansion device 24 respectively provide a pressure reduction of the cooling fluid.

The first expansion device 23 is located upstream of the first evaporator 13, in line with the direction of circulation of the cooling fluid in the cooling fluid circuit 1, and the second expansion device 24 is located upstream of the second evaporator 19, in line with the direction of circulation of the cooling fluid in the cooling fluid circuit 1.

The first expansion device 23 and the second expansion device 24 can, for example, take the shape of a fixed cross section orifice or of an electronically controlled expansion device obeying a control strategy implemented by a control unit. The first expansion device 23 and the second expansion device 24 can also take the shape of a thermostatic expansion valve, as they are represented in the figures. The invention is not limited to one identity of shape between the first expansion device 23 and the second expansion device 24. For example, the first expansion device 23 takes the shape of a fixed cross section orifice while the second expansion device 24 takes the shape of a thermostatic expansion valve.

The first expansion device 23 authorizes the passage of the cooling fluid so that it enters the first evaporator 13 via an inlet orifice. The cooling fluid makes its way into the first evaporator 13. According to the present invention, the outer air flow 14 passes through the first evaporator 13. In a preferential and particularly advantageous manner, the first evaporator 13 is installed in the vehicle so as to receive the outer air flow 14 after the latter has already passed through the first outer heat exchanger 15. In other words, the first evaporator 13 is located downstream, advantageously in the continuation of the first outer heat exchanger 15, in line with the direction of circulation of the outer air flow 14.

The first evaporator 13 includes another outlet orifice, through which the cooling fluid exits in the direction of a first connection point 27.

In this configuration, the first evaporator 13 provides a cooling function of the outer air flow 14 when the thermal conditioning device is used in so-called "heating" mode, in so-called "drying" mode and in so-called "defrosting" mode. Moreover, preferentially, the cooling fluid does not pass through the first evaporator 13 when the thermal conditioning device according to the invention is in so-called "cooling" mode. One therefore understands that the first evaporator 13 is inactive in so-called "cooling" mode.

The second outlet way of the circulation management unit 18 is connected to the second expansion device 24, which authorizes the passage of the cooling fluid towards an inlet orifice of the second evaporator 19. The second evaporator 19 also includes an outlet orifice, through which the cooling fluid exits the second evaporator 19 to arrive at the connection point 27.

The second evaporator 19 enables a circulation of the cooling fluid. An inner air flow 12, that is to say an air flow intended to be sent into the passenger compartment of the vehicle, passes through the second evaporator 19.

The pressure reduction of the cooling fluid controlled by the second expansion device 24 enables a cooling of the inner air flow 12 circulating through the second evaporator 19.

The connection point 27 collects the cooling fluid arriving from the first evaporator 13 and/or arriving from the second evaporator 19 in order to channel it towards the compressor 3.

The various components of the cooling fluid circuit 1 described above are connected to each other by means of connection pieces, pipes or any means suited to channeling the cooling fluid.

As mentioned previously, the thermal conditioning device according to the invention also includes the heat transfer fluid circuit 2, in which the heat transfer fluid circulates.

The heat transfer fluid circuit 2 forms a closed loop, inside which the heat transfer fluid circulates. The heat transfer fluid is, for example, a composition based on water with added glycol.

The heat transfer fluid circuit 2 includes at least one inner heat exchanger 30, a second outer heat exchanger 31, through which the outer air flow 14 passes, and a first heat source 32.

The inner heat exchanger 30 is a heat exchanger, through which the heat transfer fluid and the inner air flow 12 pass. The inner heat exchanger 30 is described as "inner" in the sense that it is constructed to exchange calories with the inner air flow 12 distributed in the passenger compartment of the vehicle. One therefore understands that the inner heat exchanger 30 is an air/heat transfer fluid heat exchanger, also called a unit heater. Advantageously, the inner heat exchanger 30 is installed downstream of the second evaporator 19 in line with the direction of circulation of the inner air flow 12.

The second outer heat exchanger 31 is a heat exchanger, through which the heat transfer fluid and the outer air flow 14 pass. It is therefore an air/heat transfer fluid exchanger, also called a heater. The second outer heat exchanger 31 is advantageously installed at the front end of the vehicle.

According to an alternative embodiment, the construction of the second outer heat exchanger 31 is combined with that of the first evaporator 13, in particular in the shape of a unitary module.

The first evaporator 13 is constructed for the passage of the outer air flow 14, having previously passed through the second outer heat exchanger 31. In other words, the first evaporator 13 is installed downstream of the second outer heat exchanger 31 in line with the direction of circulation of the outer air flow 14. The second outer heat exchanger 31 therefore exchanges calories with the outer air flow 14, which contributes to raising the temperature of the outer air flow 14. This temperature increase of the outer air flow 14 enables the first evaporator 13 to be heated and thus the formation of hoarfrost on the latter to be avoided.

One will note, moreover, that the second outer heat exchanger 31 is interposed between the first outer heat exchanger 15 and the first evaporator 13. In other words, the second outer heat exchanger 31 is downstream of the first outer exchanger 15 and upstream of the first evaporator 13 in line with the direction of circulation of the outer air flow 14.

The heat transfer fluid circuit 2 also includes the first heat source 32. The first heat source 32 can notably be an internal combustion engine, an electric motor or an electric heating element. The first heat source 32 is a source of calories 32. The first heat source 32 enables the heat transfer fluid circulating in the second outer heat exchanger 31 to be heated.

The thermal conditioning device according to the invention therefore takes advantage of the presence of the first heat source 32, for example of the internal combustion engine, to use the calories released in the aim of preventing frosting of the first evaporator 13. It is also envisaged, as part of the present invention, specifically to activate the first heat source 32 in so-called "defrosting" mode.

The heat transfer fluid circuit 2 includes at least one first loop 33a. According to the present invention, the heat transfer fluid circuit 2 is divided into a first loop 33a and a second loop 33b. The first loop 33a and the second loop 33b include a common part, or common branch including the fluid/fluid heat exchanger 6 and a means of creating circulation 34, such as a pump 34, suited to providing the circulation of the heat transfer fluid in the heat transfer fluid circuit 2. It is therefore understood that the means of creating circulation 34 and the fluid/fluid heat exchanger 6 are used by the first loop 33a and by the second loop 33b.

Additionally to the fluid/fluid heat exchanger 6 and to the means of creating circulation 34, the first loop 33a includes the inner heat exchanger 30. Moreover, advantageously, the first loop 33a also includes a shut-off valve 35, whose function is to authorize or to prohibit the circulation of heat transfer fluid in the first loop 33a.

Additionally to the fluid/fluid heat exchanger 6 and to the means of creating circulation 34, the second loop 33b also includes a first ramification 36, including the second outer heat exchanger 31 and a second ramification 37, including a third outer heat exchanger 38.

According to the configuration of the present invention, the first ramification 36 is parallel with the second ramification 37.

The first ramification 36 of the second loop 33b of the heat transfer fluid circuit 2 includes a first changeover means 39, such as a "three-way" valve 39, installed upstream of the second outer heat exchanger 31 in line with the direction of circulation of the heat transfer fluid in the first ramification 36. The first changeover means 39 also enables the supply to a first bypass pipe 40, installed in parallel with the second outer heat exchanger 31. The first bypass pipe 40 includes the first heat source 32 and enables heat transfer fluid to be transported towards the first heat source 32.

Moreover, according to another particular configuration, it is thus possible, by adding a pump, not illustrated, in the first ramification 36, or in the first bypass pipe 40, to define a closed loop constituted by the part of the first ramification 36 that includes the first heat source 32 and the second outer heat exchanger 31, and by the first bypass pipe 40 in order to provide cooling of the first heat source 32.

The second ramification 37 of the second loop 33b of the heat transfer fluid circuit 2 includes a second changeover means 41, such as a "three-way" valve 41, installed upstream of the third outer heat exchanger 38 in line with the direction of circulation of the heat transfer fluid in the second ramification 37. The second changeover means 41 also enables the supply to a second bypass pipe 42, installed in parallel with the third outer heat exchanger 38.

The heat transfer fluid also passes through a second heat source 43. The second heat source 43 is notably in the form of an electric motor, suited to providing the movement of the vehicle. The second heat source 43 is installed in the second ramification 37 in series with the third outer heat exchanger 38.

Notably, the second heat source 43 is installed directly downstream of the third outer heat exchanger 38 in line with the direction of circulation of the heat transfer fluid in the second ramification 37. The second bypass pipe 42 is thus installed in parallel with the third outer heat exchanger 38 and with the second heat source 43. In particular, according to a defined configuration, the second bypass pipe 42 is constructed such that the heat transfer fluid does not pass through the third outer heat exchanger 38 and the second heat source 43 when this is imposed by the second changeover means 41.

Moreover, according to another particular configuration, it is thus possible, by adding a pump, not illustrated, in the second ramification 37, or in the second bypass pipe 42, to define a closed loop constituted by the part of the second ramification 37 that includes the second heat source 43 and the third outer heat exchanger 38, and by the second bypass pipe 42 in order to provide cooling of the second heat source 43.

The third outer heat exchanger 38 and the first outer exchanger 15 are installed in relation to each other such that the outer air flow 14 passes through them. According to an advantageous arrangement, distinct portions of the outer air flow 14 pass through the third outer heat exchanger 38 and the first outer exchanger 15.

In practice, the sides of the third outer heat exchanger 38 and of the first outer exchanger 15, through which the outer air flow 14 passes, extend in the same plane. In particular, the third outer heat exchanger 38 occupies between 50% and 70% of the total area through which the outer air flow 14 passes, and the first outer exchanger 15 occupies between 50% and 30% of the total area through which the outer air flow 14 passes.

According to a variant embodiment, the third outer heat exchanger 38 and the first outer exchanger 15 can form a unitary module intended to be installed at the front end of the vehicle. The unitary character is illustrated on the figures by a rectangle in a mixed dotted line with reference number 44.

In particular, the calorific value of the first heat source 32 is greater than the calorific value of the second heat source 43. In other words, according to the embodiment example presented, the internal combustion engine releases more heat than the electric motor.

We shall henceforth refer to FIGS. 1 to 4 in order to describe different functioning modes of the thermal conditioning device according to the invention. By convention, in FIGS. 1 to 4, the dotted lines illustrate an absence of circulation of the fluid in a part of the circuit and/or in the components, and the solid lines illustrate a circulation of the fluid in a part of the circuit and/or in the components.

FIG. 1 is a diagrammatic view of the thermal conditioning device according to the invention in so-called "cooling" mode, that is to say, corresponding to a need to cool the inner air flow 12 distributed in the passenger compartment.

In so-called "cooling" mode, the cooling fluid circuit 1 is configured such that the cooling fluid, compressed and made to circulate by the compressor 3, passes through the fluid/fluid heat exchanger 6, where the cooling fluid yields calories to the heat transfer fluid. The fluid/fluid heat exchanger 6 thus provides a condensation phase of the cooling fluid necessary to the thermodynamic cycle. The cooling fluid is thus condensed and continues on its way, passing through the storage device 9 and exiting it in the liquid state. Subsequently, the cooling fluid passes through the first outer heat exchanger 15, where it undergoes a subcooling phase, that is to say, a reduction in its temperature when the cooling fluid is in the liquid state.

The circulation management unit 18 is constructed such that it prohibits the circulation of the cooling fluid towards the first evaporator 13 and authorizes the circulation of the cooling fluid towards the second expansion device 24, through which it undergoes a pressure reduction.

The cooling fluid expanded in this way exchanges with the inner air flow 12 in the second evaporator 19. The cooling fluid then returns to the compressor 3.

In so-called "cooling" mode, the heat transfer circuit 2 is configured such that the first loop 33*a* is inactive in the sense that the heat transfer fluid does not circulate in the first loop 33*a*. To this effect, the shut-off valve 35 is closed.

The means of creating circulation 34 provides circulation of the heat transfer fluid, which passes through the fluid/fluid heat exchanger 6. The heat transfer fluid exits the fluid/fluid heat exchanger 6 at a higher temperature and circulates in the direction of the second outer heat exchanger 31, passing through the first changeover means 39. In this functioning mode, so-called "cooling" mode, the first changeover means 39 is configured such that it prohibits the circulation of the heat transfer fluid in the first bypass pipe 40.

The heat transfer fluid exchanges with the outer air flow 14 on passing through the second outer heat exchanger 31. The heat transfer fluid thus cooled returns to the means of creating circulation 34.

No heat transfer fluid passes through the other components of the circuit, not mentioned in the above description, in the mode called "cooling", corresponding to a need to cool the inner air flow 12 distributed in the passenger compartment.

FIG. 2 is a diagrammatic view of the thermal conditioning device according to the invention used in so-called "heating" mode, used particularly, for example, in winter weather, that is to say, corresponding to a need to heat the inner air flow 12 distributed in the passenger compartment.

The description that will be made of the mode called "heating" will focus on the differences from the mode called "cooling" described in FIG. 1. Reference will therefore be made to the description of FIG. 1 for identical elements functioning in a similar fashion.

Contrary to FIG. 1, in so-called "heating" mode, the cooling fluid does not pass through the second evaporator 19. To this effect, the circulation management unit 18 is controlled such that it sends the totality of the cooling fluid towards the first expansion device 23.

The first expansion device 23 reduces the pressure of the cooling fluid passing through it. The cooling fluid then enters the first evaporator 13 and happens to be heated by the outer air flow 14. In the particular configuration of the present invention, the outer air flow 14 was notably heated beforehand on passing through the first outer exchanger 15. The cooling fluid continues on its way to the compressor 3.

In so-called "heating" mode, the heat transfer fluid circuit 2 is configured such that the second loop 33*b* is inactive, in the sense that the heat transfer fluid does not circulate in the second loop 33*b*. Consequently, the heat transfer fluid does not circulate in the first ramification 36 and/or in the second ramification 37. To this effect, the first changeover means 39 and the second changeover means 41 are configured in the closed position such that they prohibit the circulation in the second loop 33*b*.

The means of creating circulation 34 provides circulation of the heat transfer fluid in the first loop 33*a*. The heat transfer fluid passes through the fluid/fluid heat exchanger 6 to collect the calories released by the condensation of the cooling fluid.

The heat transfer fluid, heated in this way, is sent towards the inner heat exchanger 30. To achieve this, the shut-off valve 35 authorizes the passage of the heat transfer fluid. The inner air flow 12 is therefore heated on passing through the inner heat exchanger 30. The heat transfer fluid is therefore cooled and is once again advantageously used for the condensation of the cooling fluid in the fluid/fluid heat exchanger 6.

FIG. 3 is a diagrammatic view of the thermal conditioning device according to the invention used in so-called "drying" mode, that is to say, corresponding to a need to dry the inner air flow 12. In practice, the mode called "drying" requires both heating and cooling of the inner air flow 12.

Similarly, the description that will be made of the mode called "drying" will focus on the differences from the mode called "heating" described at FIG. 2. Reference will therefore be made to the description of FIG. 2 for identical elements functioning in a similar fashion.

In so-called "drying" mode, the circulation management unit 18 controls the circulation of the cooling fluid simultaneously towards the first evaporator 13 and towards the second evaporator 19. Control of the circulation of the cooling fluid can be adjusted if necessary in order to manage the proportions of the cooling fluid sent towards the first evaporator 13 and towards the second evaporator 19. Alternatively, in so-called "drying" mode, the circulation management unit 18 can be constructed such that it prohibits the circulation of the cooling fluid towards the first evaporator 13 and authorizes the circulation of the cooling fluid towards the second evaporator 19.

The second evaporator 19 receives the cooling fluid and dries the inner air flow 12 prior to its distribution in the passenger compartment of the vehicle.

It is advantageous to have distinct air flows passing through the first evaporator 13 and the second evaporator 19. In fact, the first evaporator 13 replenishes the quantity of cooling fluid expanded by the second evaporator 19. The heat load of the cooling fluid circuit is thus increased, which guarantees a high efficiency of the thermodynamic cycle operated by the cooling fluid circuit.

It is therefore possible to obtain efficient condensation in the fluid/fluid heat exchanger 6, which guarantees a high temperature of the heat transfer fluid circulating in the first loop 33a. Heating of the inner air flow 12 can then be efficiently provided by the inner heat exchanger 30.

FIG. 4 is a diagrammatic view of the thermal conditioning device according to the invention, used in so-called "defrosting" mode, that is to say, corresponding to a need to defrost the first evaporator 13.

In particular, the mode called "defrosting" intervenes following the utilization of the thermal conditioning device according to the invention in the mode called "heating". The cooling fluid circuit is essentially configured in a similar fashion to the functioning mode described at FIG. 2 corresponding to the mode called "heating".

Once again, the description that will be made of the mode called "defrosting" will focus on the differences from the mode called "heating" described at FIG. 2. Reference will therefore be made to the description of FIG. 2 for identical elements functioning in a similar fashion.

The particularity of the mode called "defrosting" resides in the configuration of the heat transfer circuit 2. The first heat source 32 is used advantageously to enable defrosting of the first evaporator 13. In other words, one performs a stage of starting up the first heat source 32, for example, the internal combustion engine, the electric motor or the electric heating element, so as to generate calories retrieved via the heat transfer fluid.

In so-called "defrosting" mode, the first changeover means 39 is placed in a configuration enabling the first ramification 36 to be isolated in relation to the second loop 33b in order to place the first heat source 32 in direct relation with the second outer heat exchanger 31. The heat transfer fluid heated in contact with the first heat source 32 passes through the second outer heat exchanger 31, enabling a transfer of calories to the outer air flow 14.

In so-called "defrosting" mode, the outer air flow 14, which heated up beforehand on passing through the second outer heat exchanger 31, passes through the first evaporator 13. Very rapid defrosting therefore takes place, which makes the thermal conditioning device according to the invention available once more for a functioning phase in so-called "heating" mode. As mentioned previously, a pump, not illustrated, is constructed such that it enables the circulation of the heat transfer fluid through the first heat source 32 and the second outer heat exchanger 31.

In so-called "defrosting" mode, the second outer heat exchanger 31 is no longer available to provide cooling of the heat transfer fluid circulating in the second loop 33b.

Advantageously, according to the present invention, the heat transfer fluid is then steered towards the third outer heat exchanger 38. To this effect, the second changeover means 41 authorizes the passage of the heat transfer fluid towards the third outer heat exchanger 38. The heat transfer fluid is thus cooled on passing through the third outer heat exchanger 38, by an exchange with the outer air flow 14.

The cooled heat transfer fluid passes through the second heat source 43 and thus provides cooling of the second heat source 43, in particular, the electric motor. In doing so, the second heat source 43 supplies calories to the heat transfer fluid.

In a particularly advantageous fashion, for example, in all-electric mode, the second heat source 43, notably in "defrosting" mode, enables the outer air flow 14 to be heated before passing through the first evaporator 13.

Subsequently, the heat transfer fluid returns in the direction of the means of creating circulation 34.

Finally, the second outer heat exchanger 31 is not available to cool the heat transfer fluid coming from the fluid/fluid heat exchanger 6. In fact, the first heat source 32 delivers calories, which the second outer heat exchanger 31 is responsible for dispersing into the outer air flow 14. Such a situation appears in so-called "defrosting" mode, since the first heat source 32 is specifically activated in this mode.

The activation of the first heat source 32 can also be performed in one of the modes described previously in relation to FIGS. 1 to 3. In such a case, the cooling of the heat transfer fluid is then provided by the second ramification 37 and the components contained in the second ramification 37.

According to an alternative embodiment, not illustrated, it can be envisaged that the thermal conditioning device may dispense with the second ramification 37.

Moreover, the different functioning modes described previously can be taken separately or combined in order to create alternative embodiments and different configurations of a thermal conditioning device such as that defined according to the present invention.

The invention claimed is:

1. A thermal conditioning device including a cooling fluid circuit, a heat transfer fluid circuit, and a fluid/fluid heat exchanger,
   wherein the cooling fluid circuit includes at least one compressor, a first outer heat exchanger through which an outer air flow passes, and a first evaporator,
   wherein the heat transfer fluid circuit includes at least one inner heat exchanger, a first heat source and a second outer heat exchanger through which the outer air flow passes,
   wherein the cooling fluid circuit further includes a second evaporator,
   wherein the first evaporator is constructed for the passage of the outer air flow, and
   wherein the outer air flow successively passes through the second outer heat exchanger, then through the first evaporator.

2. The thermal conditioning device as claimed in claim 1, wherein the second evaporator is installed in the cooling fluid circuit, in parallel with the first evaporator.

3. The thermal conditioning device as claimed in claim 1, wherein the cooling fluid circuit includes a management unit for circulating the cooling fluid towards the first evaporator and/or the second evaporator.

4. The thermal conditioning device as claimed in claim 3, wherein the cooling fluid circuit includes a single management unit for circulating the cooling fluid towards the first evaporator and/or the second evaporator.

5. The thermal conditioning device as claimed in claim 1, wherein the first outer heat exchanger is constructed for the passage of the outer air flow prior to the passage of the outer air flow through the first evaporator.

6. The thermal conditioning device as claimed in claim 1, wherein the first outer heat exchanger is constructed for the passage of the outer air flow prior to the passage of the outer air flow through the second outer heat exchanger.

7. The thermal conditioning device as claimed in claim 1, wherein the heat transfer fluid circuit includes at least a first loop including the fluid/fluid heat exchanger and the inner heat exchanger.

8. The thermal conditioning device as claimed in claim 1, wherein the heat transfer fluid circuit includes a second loop including the fluid/fluid heat exchanger, the first heat source and a second heat source.

9. The thermal conditioning device as claimed in claim 8, wherein the second loop includes a third outer heat exchanger installed in series with the second heat source and constructed for the passage of the outer air flow prior to the passage of the outer air flow through the first evaporator.

10. The thermal conditioning device as claimed in claim 9, wherein the third outer heat exchanger is constructed for the passage of the outer air flow prior to the passage of the outer air flow through the second outer heat exchanger.

11. The thermal conditioning device as claimed in claim 8, wherein the third outer heat exchanger and the first outer heat exchanger are constructed for the passage of distinct portions of outer air flow.

12. The thermal conditioning device as claimed in claim 1, wherein an inner air flow intended to be distributed in the passenger compartment of a vehicle passes through the inner heat exchanger and the second evaporator.

13. A thermal conditioning device including a cooling fluid circuit, a heat transfer fluid circuit, and a fluid/fluid heat exchanger,
   wherein the cooling fluid circuit includes at least one compressor, a first outer heat exchanger through which an outer air flow passes, and a first evaporator,
   wherein the heat transfer fluid circuit includes at least one inner heat exchanger, a first heat source and a second outer heat exchanger through which the outer air flow passes,
   wherein the cooling fluid circuit further includes a second evaporator, and
   wherein the first outer heat exchanger is constructed for the passage of the outer air flow prior to the passage of the outer air flow through the first evaporator.

14. A thermal conditioning device including a cooling fluid circuit, a heat transfer fluid circuit, and a fluid/fluid heat exchanger,
   wherein the cooling fluid circuit includes at least one compressor, a first outer heat exchanger through which an outer air flow passes, and a first evaporator,
   wherein the heat transfer fluid circuit includes at least one inner heat exchanger, a first heat source and a second outer heat exchanger through which the outer air flow passes,
   wherein the cooling fluid circuit further includes a second evaporator, and
   wherein the first outer heat exchanger is constructed for the passage of the outer air flow prior to the passage of the outer air flow through the second outer heat exchanger.

* * * * *